United States Patent  
Chou et al.

(10) Patent No.: US 9,070,092 B2
(45) Date of Patent: Jun. 30, 2015

(54) MOBILE DEVICE WITH WEATHER CONDITION DISPLAY SERVED BY A NETWORK

(75) Inventors: Peter Chou, Taoyuan County (TW); Hsu-Jung Chen, Taoyuan County (TW); Sheng-Hsin Huang, Taoyuan County (TW); Chia-Chia Shieh, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 129 days.

(21) Appl. No.: 12/882,223

(22) Filed: Sep. 15, 2010

(65) Prior Publication Data

US 2011/0076992 A1   Mar. 31, 2011

(30) Foreign Application Priority Data

Sep. 29, 2009 (TW) .............................. 98133036 A

(51) Int. Cl.
*G06Q 10/00* (2012.01)
*G06Q 30/02* (2012.01)
*H04L 29/06* (2006.01)

(52) U.S. Cl.
CPC ................ *G06Q 10/00* (2013.01); *H04L 29/06* (2013.01); *G06Q 30/0252* (2013.01)

(58) Field of Classification Search
USPC ..................................................... 455/414.3
See application file for complete search history.

(56) References Cited

U.S. PATENT DOCUMENTS

| 7,530,026 | B2 | 5/2009 | Chaudhri et al. | |
|---|---|---|---|---|
| 2004/0075675 | A1* | 4/2004 | Raivisto et al. | 345/700 |
| 2005/0134607 | A1* | 6/2005 | Purdy | 345/629 |
| 2007/0112511 | A1* | 5/2007 | Burfeind et al. | 701/213 |
| 2008/0026798 | A1* | 1/2008 | Kim | 455/566 |
| 2008/0082930 | A1* | 4/2008 | Omernick et al. | 715/765 |
| 2008/0201647 | A1* | 8/2008 | Lagerstedt et al. | 715/748 |

FOREIGN PATENT DOCUMENTS

| CN | 1929639 | 3/2007 |
|---|---|---|
| GB | 2407230 | 4/2005 |
| KR | 20040110232 | 12/2004 |
| KR | 20070070646 | 7/2007 |
| TW | 490571 | 6/2002 |
| TW | 200926753 | 6/2009 |
| TW | 200930032 | 7/2009 |

(Continued)

OTHER PUBLICATIONS

Amtsblatt EPA / Official Journal EPO / Journal officiel OEB issue from the European Patent Office dated Oct. 1, 2007( OJ Nov. 2007 ; p. 572f ).

(Continued)

*Primary Examiner* — Gerald Johnson
(74) *Attorney, Agent, or Firm* — Jianq Chyun IP Office

(57) ABSTRACT

A method and an apparatus for displaying a weather condition and a recording medium are provided. In the present method, positioning information of a mobile device is detected, and weather information of the current location of the mobile device is inquired. Then, a weather type is determined according to the weather information, and a weather type image corresponding to the weather type is displayed on a screen of the mobile device. Finally, a corresponding weather condition animation is determined according to the weather type and the weather information and played on a background of the screen.

21 Claims, 11 Drawing Sheets

(56) References Cited

FOREIGN PATENT DOCUMENTS

| | | |
|---|---|---|
| TW | 200930983 | 7/2009 |
| WO | 2008131417 | 10/2008 |

OTHER PUBLICATIONS

"Search Report of European Counterpart Application", issued on Mar. 21, 2011, p. 1-p. 2.

"First Office Action of European Counterpart Application", issued on Mar. 30, 2011, p. 1-p. 6.

"First Office Action of China Counterpart Application", issued on Jul. 6, 2011, p. 1-p. 6.

"Notice of Allowance of Taiwan Counterpart Application", issued on Aug. 28, 2013, p. 1-p. 5.

"Office Action of European Counterpart Application," issued on Feb. 18, 2015, p. 1-6.

\* cited by examiner

MOBILE DEVICE WITH WEATHER CONDITION DISPLAY SERVED BY A NETWORK

CROSS-REFERENCE TO RELATED APPLICATION

This application claims the priority benefit of Taiwan application serial No. 98133036, filed on Sep. 29, 2009. The entirety of the above-mentioned patent application is hereby incorporated by reference herein and made a part of this specification.

BACKGROUND

Along with the rapid development of mobile communication technology, mobile add-ons provided by mobile communication service providers have been diversified. Different information, such as news, business, weather, and entertainment, can all be provided by these mobile communication service providers. For example, weather forecast is one of the important information related to our daily life. In an existing method for obtaining weather forecast information through a mobile phone, a user may request the weather forecast information from a service provider by sending a short message (SMS) to the service provider, or the user may also directly connect to a weather forecast website through a wireless network connection to inquire the current weather type.

However, all the techniques described above for obtaining weather forecast information require the user to first determine the area where the user is located and then input or select the area to inquire the weather type, which is very complicated and inconvenient. Besides, the weather forecast information obtained by the user is usually limited to a weather type (for example, "clear", "cloudy", and "rain", etc.) presented in simple text or image. However, such a weather type display technique cannot present the actual feel of the user in the environment. As a result, the user may not be able to dress properly under different weather conditions.

SUMMARY

Accordingly, the present application is directed to a weather condition display method, wherein weather information is obtained according to a current location and corresponding image and animation are displayed, so that a weather condition of the current location may be represented.

The present application is directed to a weather condition display apparatus, wherein a weather type is determined according to weather information so as to display a corresponding weather type image, and an animation presenting a weather condition is played according to time or other weather information, so that the real feel of a user to the weather condition may be presented.

The present application provides a weather condition display method adaptable to a mobile device. In the present method, positioning information of the mobile device is detected, and weather information according to the positioning information of the mobile device is inquired. Then, a weather type is determined according to the weather information, and a weather type image corresponding to the weather type is displayed on a screen of the mobile device. Besides, a corresponding weather condition animation is played according to the weather type on a background of the screen.

In an example of the present application, the step of inquiring the weather information of the area where the mobile device is current located by using the positioning information comprises connecting to a weather information website on a network and transferring the positioning information to the weather information website to inquire the weather information of the area where the mobile device is currently located.

In an example of the present application, the step of displaying the weather type image on the screen of the mobile device comprises displaying the weather type image within a weather widget on the screen.

In an example of the present application, the step of playing the weather condition animation on the background of the screen comprises playing the weather condition animation within the weather widget and within an area outside other widgets on the screen.

In an example of the present application, the step of determining the weather type according to the weather information and displaying the weather type image corresponding to the weather type on the screen of the mobile device further comprises inquiring time information of the area where the mobile device is currently located and determining the weather type according to the weather information and the time information, so as to display the weather type image corresponding to the weather type on the screen of the mobile device.

In an example of the present application, the step of inquiring the time information of the area where the mobile device is currently located comprises determining a time zone of the area where the mobile device is currently located and inquiring the current time information of the time zone.

In an example of the present application, the step of displaying the weather type image on the screen of the mobile device comprises displaying a clock according to the time information and displaying both the weather type image and the clock within the weather widget on the screen.

In an example of the present application, the step of playing the weather condition animation on the background of the screen comprises playing the weather condition animation within the clock widget and within an area outside other widgets on the screen.

In an example of the present application, the weather information comprises one or a combination of weather type, temperature, humidity, pressure, wind direction, wind force, visibility, ultraviolet (UV) intensity, and probability of precipitation.

In an example of the present application, the step of determining the corresponding weather condition animation according to the weather type and playing the weather condition animation on the background of the screen comprises determining the corresponding weather condition animation according to the weather type and other weather information.

In an example of the present application, the step of playing the corresponding weather condition animation on the background of the screen according to the weather type and other weather information comprises determining the corresponding weather condition animation according to the weather type and a temperature in the weather information.

In an example of the present application, the step of determining the corresponding weather condition animation according to the weather type and the temperature in the weather information comprises determining whether the temperature exceeds a predetermined temperature, wherein if the temperature exceeds the predetermined temperature, a first weather condition animation corresponding to the weather type is played, and if the temperature does not exceed the predetermined temperature, a second weather condition animation corresponding to the weather type is played.

In an example of the present application, the step of determining the corresponding weather condition animation according to the weather type and playing the weather condition animation on the background of the screen further comprises inquiring the time information of the area where the mobile device is currently located and determining the corresponding weather condition animation according to the weather type and the time information.

In an example of the present application, the weather type image is displayed when or after the weather condition animation is played.

In an example of the present application, after the step of displaying the weather type image and playing the weather condition animation, the method further comprises re-inquiring the weather information of the area where the mobile device is currently located at constant intervals so as to update the displayed weather type image.

In an example of the present application, after the step of displaying the weather type image and playing the weather condition animation, the method further comprises receiving a re-inquiring command from a user to re-inquire the weather information of the area where the mobile device is currently located and updating the displayed weather type image.

In an example of the present application, after the step of displaying the weather type image and playing the weather condition animation, the method further comprises continuously detecting the positioning information of the mobile device to determine whether the positioning information changes, and re-inquiring the weather information of the area where the mobile device is currently located when the positioning information changes, so as to update the displayed weather type image.

In an example of the present application, after the step of displaying the weather type image and playing the weather condition animation, the method further comprises re-playing the weather condition animation and displaying the weather type image every time when the mobile device is switched to a screen page with a weather display function, wherein the screen page with the weather display function comprises a homepage, a weather widget page, a clock widget page, or a weather function page of the mobile device.

The present application provides a weather condition display apparatus comprising a display unit, a positioning unit, a network unit, an inquiry module, a weather type display module, and a weather condition animation play module. The display unit displays a screen page. The positioning unit detects positioning information of the current location of the weather condition display apparatus. The network unit is used for connecting to a network. The inquiry module inquires weather information according to the current positioning information. The weather type display module determines a weather type according to the weather information obtained by the inquiry module and displays a weather type image corresponding to the weather type on the screen. The weather condition animation play module determines a corresponding weather condition animation according to the weather type determined by the weather type display module and the weather information obtained by the inquiry module and playing the weather condition animation on a background of the screen.

In an example of the present application, the inquiry module connects to weather information website on the network through the network unit and transfers the positioning information to the weather information website to inquire the weather information of the current area.

In an example of the present application, the weather type display module displays the weather type image within a weather widget on the screen, and the weather condition animation play module plays the weather condition animation within the weather widget and within an area outside other widgets on the screen.

In an example of the present application, the weather condition display apparatus further comprises a time inquiry module which determines a time zone of the current area and inquires current time information of the time zone.

In an example of the present application, the weather type display module further displays a clock according to the time information obtained by the time inquiry module and displays both the clock and the weather type image within the weather widget.

In an example of the present application, the weather type display module further displays the clock according to the time information obtained by the time inquiry module and displays both the clock and the weather type image within a clock widget.

In an example of the present application, the weather condition animation play module determines the corresponding weather condition animation according to the weather type determined by the weather type display module and a temperature in the weather information obtained by the inquiry module.

In an example of the present application, the weather condition animation play module determines whether the temperature in the weather information exceeds a predetermined temperature, wherein if the temperature exceeds the predetermined temperature, the weather condition animation play module plays a first weather condition animation corresponding to the weather type, and if the temperature does not exceed the predetermined temperature, the weather condition animation play module plays a second weather condition animation corresponding to the weather type.

In an example of the present application, the weather type display module displays the weather type image when or after the weather condition animation play module plays the weather condition animation.

In an example of the present application, the inquiry module further receives a re-inquiring command to re-inquire the weather information of the current area and update the weather type image displayed by the weather type display module.

In an example of the present application, the inquiry module further re-inquires the weather information of the current area at constant intervals to update the weather type image displayed by the weather type display module.

In an example of the present application, the inquiry module further determines whether the positioning information detected by the positioning unit changes, and when the positioning information changes, the inquiry module re-inquires the weather information of the current area to update the weather type image displayed by the weather type display module.

In an example of the present application, the weather condition animation play module plays the weather condition animation and the weather type display module displays the weather type image every time when the weather condition display apparatus is switched to a screen page with a weather display function, wherein the screen page with the weather display function comprises a homepage, a weather widget page, a clock widget page, or a weather function page of the weather condition display apparatus.

The present application further provides a recording medium which records a, computer program to be loaded into a mobile device to execute following steps. First, positioning information of the mobile device is detected, and weather information according to the positioning information of the mobile device is currently located is inquired by using the positioning information. Then, a weather type is determined according to the weather information, and a weather type image corresponding to the weather type is displayed on a screen of the mobile device. Besides, a corresponding weather condition animation is played according to the weather type on a background of the screen.

The present application further provides a weather condition display system, which comprises a display means, a positioning means, a network means, an inquiry means, a weather type display means, and a weather condition animation play means. The display means is used for displaying a screen page. The positioning means is used for detecting positioning information of a current location of the system. The network means is used for connecting to a network. The inquiry means is used for inquiring weather information of a current area through the network by using the positioning information. The weather type display means is used for determining a weather type according to the weather information obtained by the inquiry means and displaying a weather type image corresponding to the weather type on the screen. The weather condition animation play means is used for determining a corresponding weather condition animation according to the weather type determined by the weather type display means and the weather information obtained by the inquiry means and playing the weather condition animation on a background of the screen page.

As described above, the present application provides a weather condition display method, a weather condition display apparatus, and a recording medium, wherein when a user activates a weather display function of a mobile device or switches to a page having a weather display function, an animation conforming to the real feel of the user to the current weather condition is played according to the current weather type and other weather information so that the user may take appropriate actions.

BRIEF DESCRIPTION OF THE DRAWINGS

The accompanying drawings are included to provide a further understanding of the application, and are incorporated in and constitute a part of this specification. The drawings illustrate examples of the application and, together with the description, serve to explain the principles of the application.

DESCRIPTION

Figure 1:
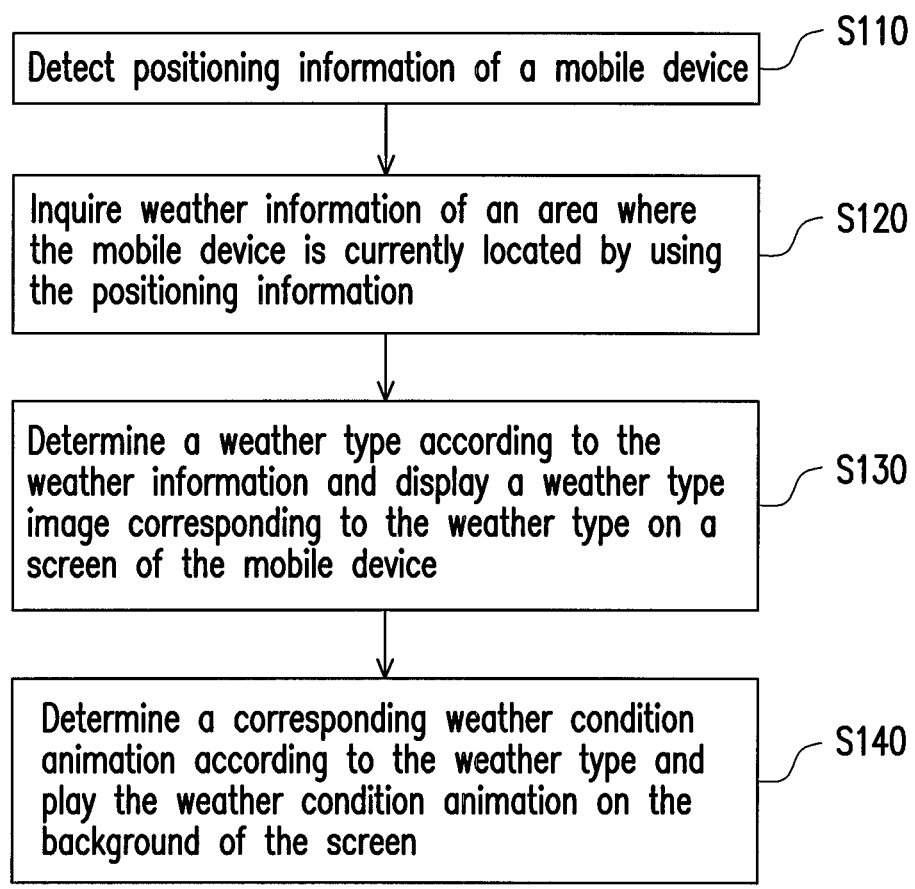
FIG. 1 is a flowchart of a weather condition display method according to a first example of the present application.
Figure 2C:
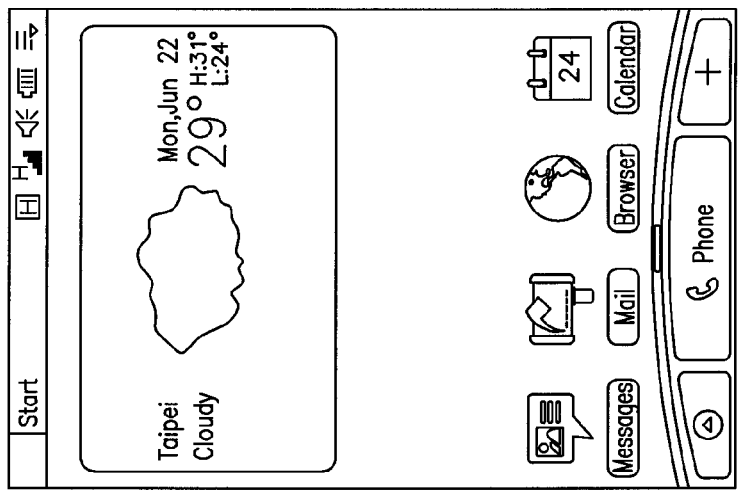
FIGS. 2A~2I illustrate examples of weather type images according to the first example of the present application.
Figure 2B:
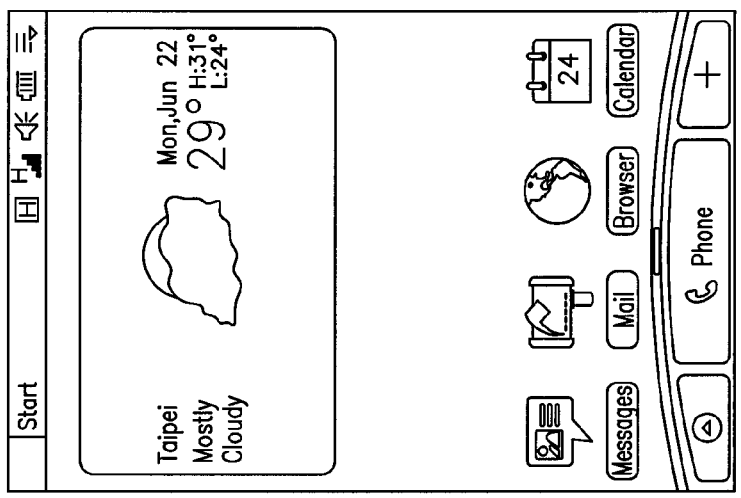
Figure 2A:
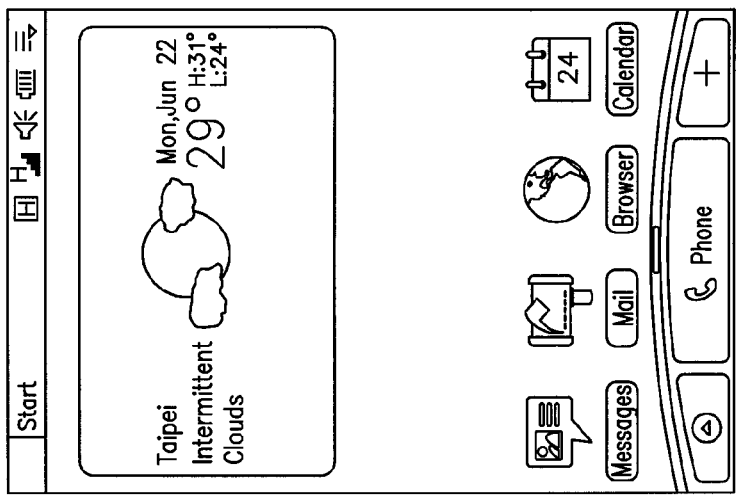
Figure 2F:
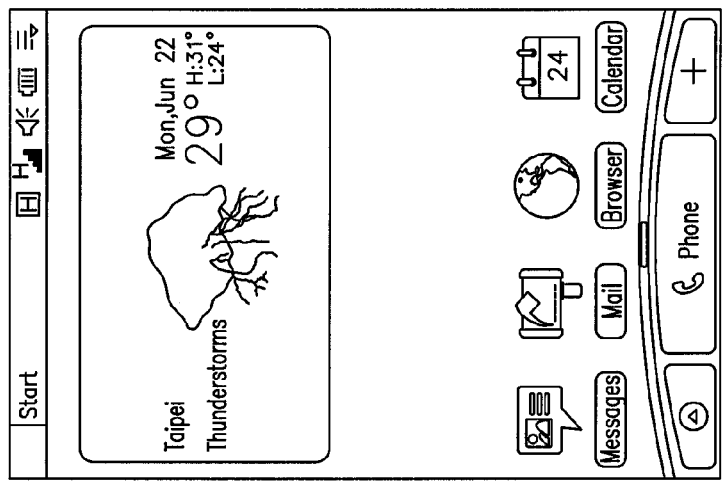
Figure 2E:
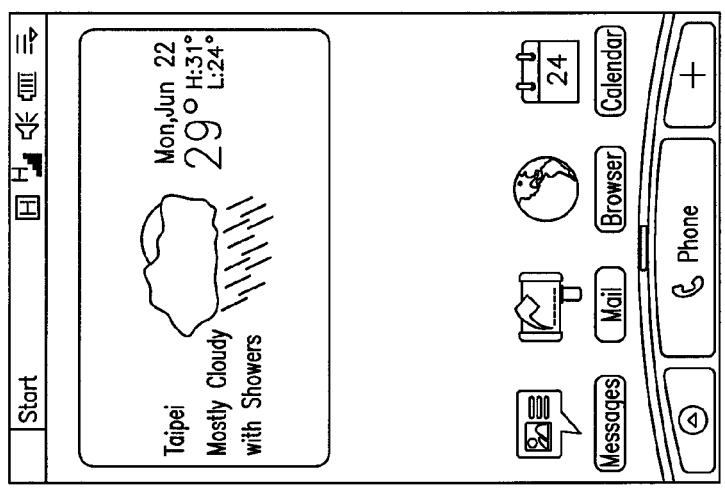
Figure 2D:
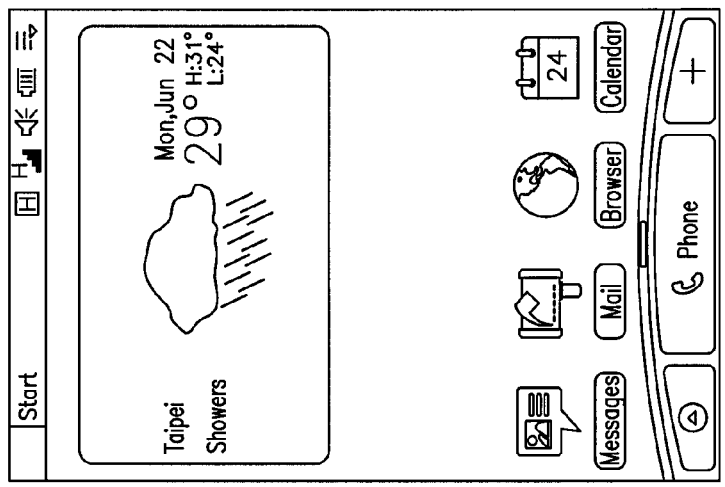
Figure 2I:
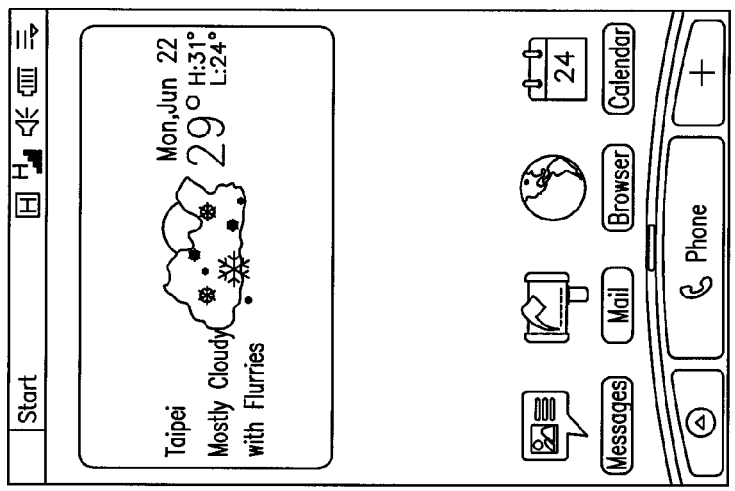
Figure 2H:
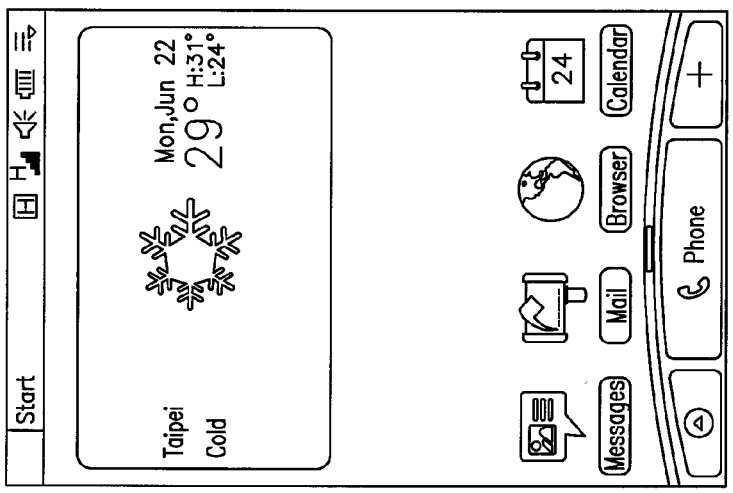
Figure 2G:
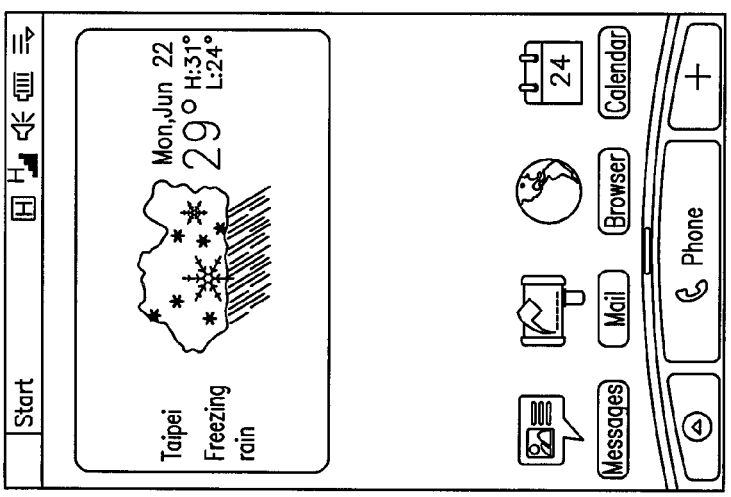

Reference will now be made in detail to the present examples of the application, examples of which are illustrated in the accompanying drawings. Wherever possible, the same reference numbers are used in the drawings and the description to refer to the same or like parts.

In the present application, weather information of the area where a mobile device is currently located is inquired according to positioning information of the mobile device, and a weather type is determined according to the weather information so as to display a corresponding image. Additionally, in the present application, a weather condition actually felt by a user at the current location is determined according to the weather type, the time, and other weather information, for example temperature and humidity, and a corresponding weather condition animation is played so as to present the weather condition to the user.

FIRST EXAMPLE

FIG. 1 is a flowchart of a weather condition display method according to the first example of the present application. The weather condition display method in the present example is adapted to a mobile device, such as a mobile phone, a personal digital assistant (PDA), a PDA phone, a smart phone, a notebook computer, a multimedia player, a game console, a navigation device, or a car computer. Various steps of the weather condition display method will be described below with reference to FIG. 1.

First, positioning information of the mobile device is detected (step S110). To be specific, the mobile device may detect the positioning information of its current location by using the global positioning system (GPS), the assisted global positioning system (AGPS), or the communication positioning system, wherein the communication positioning system may be the global system for mobile communication (GSM), the personal handy-phone system (PHS), the code division multiple access (CDMA) system, the wireless fidelity (Wi-Fi) system, the worldwide interoperability for microwave access (WiMAX) system, a radio repeater, or a radio broadcaster.

Then, weather information of an area where the mobile device is currently located is inquired by using the positioning information (step S120). To be specific, the mobile device may be connected to a network through a wired or wireless method. Then, the mobile device connects to an online weather information website through the network and transfers the previously obtained positioning information to the weather information website to inquire the weather information of the area where the mobile device is currently located, wherein the weather information may comprise weather type, temperature, humidity, pressure, wind direction, wind force, visibility, ultraviolet (UV) intensity, and probability of precipitation. However, the scope of the weather information is not limited in the present application.

After the weather information is obtained, a weather type is determined by the mobile device according to the weather information, and a weather type image corresponding to the weather type is displayed on a screen of the mobile device (step S130). The weather information obtained by the mobile device may be a short message (SMS) or a packet containing information like weather type, temperature, humidity, atmospheric pressure, wind direction, wind force, visibility, UV intensity, and probability of precipitation. When the mobile device obtains the SMS or packet, it decrypts or selects the information corresponding to weather type from the SMS or packet so as to display the corresponding weather type image. To be specific, different weather type images are built in the mobile device corresponding to different weather types, for example "clear", "cloudy", "rain", and "snow", etc. After the mobile device determines the weather type according to the weather information, it locates the corresponding weather type image from a built-in mapping table and displays the weather type image on the screen thereof, wherein the weather type image may be an image or an icon presenting the weather type.

FIGS. 2A~2I illustrate examples of weather type images according to the first example of the present application. Referring to FIG. 2A~2I, a plurality of weather type images displayed by the mobile device in the present example is illustrated, wherein the weather type images sequentially present "intermittent clouds", "mostly cloudy", "cloudy", "showers", "mostly cloudy with showers", "thunderstorms", "freezing rain", "cold", and "mostly cloudy with flurries." These images may be displayed together with text descriptions of the weather type and temperature within a weather widget in a homepage of the mobile device so that a user may look up current weather condition conveniently.

Besides displaying the weather type image, a corresponding weather condition animation is also determined by the mobile device according to the determined weather type and played on the background of the screen (step S140). To be specific, the mobile device may play an animation on the background of its screen page to present the actual appearance of the current weather condition when or before it displays the weather type image, so that the user may get a more detailed and real sensation information about the weather condition. The mobile device may find an animation corresponding to the current weather type from a built-in weather condition animation mapping table and play the animation on the background of the screen.

For example, table 1 records the mapping relationship between weather types and weather condition animations in the present example. Referring to table 1, 40 possible weather types and weather condition animations mapped to these weather types are listed. In table 1, the weather types are grouped according to their characteristics, and those weather types having similar characteristics are mapped to the same weather condition animation. For example, it rains when the weather type is "showers", "mostly cloudy with showers", "partly sunny with showers", "rain", or "partly cloudy with showers." Thus, the weather condition under these weather types is presented in the mobile device with a raining animation.

TABLE 1

| No. | Weather Type | Weather Condition Animation |
|---|---|---|
| 1 | Sunny | Sunny |
| 2 | Mostly Sunny | Sun Cloud |
| 3 | Partly Sunny | Cloudy |
| 4 | Intermittent Clouds | Cloudy |
| 5 | Hazy Sunshine | Sun Cloud |
| 6 | Mostly Cloudy | Cloudy |
| 7 | Cloudy | Cloudy |
| 8 | Dreary | Cloudy |
| 9 | Fog | Cloudy |
| 10 | Showers | Rain |
| 11 | Mostly Cloudy with Showers | Rain |
| 12 | Partly Sunny with Showers | Rain |
| 13 | Thunderstorms | Thunder |
| 14 | Mostly Cloudy with Thundershowers | Thunder |
| 15 | Partly Sunny with Thundershowers | Thunder |
| 16 | Rain | Rain |
| 17 | Flurries | Snow |
| 18 | Mostly Cloudy with Flurries | Snow |
| 19 | Partly Sunny with Flurries | Snow |
| 20 | Snow | Snow |
| 21 | Mostly Cloudy with Snow | Snow |
| 22 | Ice | Snow |
| 23 | Sleet | Snow |

TABLE 1-continued

| No. | Weather Type | Weather Condition Animation |
|---|---|---|
| 24 | Freezing Rain | Snow |
| 25 | Rain and Snow Mixed | Snow |
| 26 | Hot | Sunny |
| 27 | Cold | Snow |
| 28 | Windy | Windy |
| 29 | Clear | Moon |
| 30 | Mostly Clear | Moon Cloud |
| 31 | Partly Cloudy | Cloudy |
| 32 | Intermittent Clouds | Cloudy |
| 33 | Hazy | Moon Cloud |
| 34 | Mostly Cloudy | Cloudy |
| 35 | Partly Cloudy with Showers | Rain |
| 36 | Mostly Cloudy with Showers | Rain |
| 37 | Partly Cloudy with Thundershowers | Thunder |
| 38 | Mostly Cloudy with Thundershowers | Thunder |
| 39 | Cloudy with Flurries | Snow |
| 40 | Mostly Cloudy with Flurries | Snow |

As described above, in the present example, a weather condition is presented by displaying a weather type image and playing a weather condition animation, so that besides being informed of the weather type, a user is also allowed to experience the actual weather condition and accordingly make preparation to go out in advance appropriately. It should be mentioned that besides referring to the weather type, the mobile device may also refer to other weather information (for example, temperature and humidity) to determine the animation most suitable for presenting the weather condition. This will be described below in detail with reference to another example.

SECOND EXAMPLE

Figure 3:
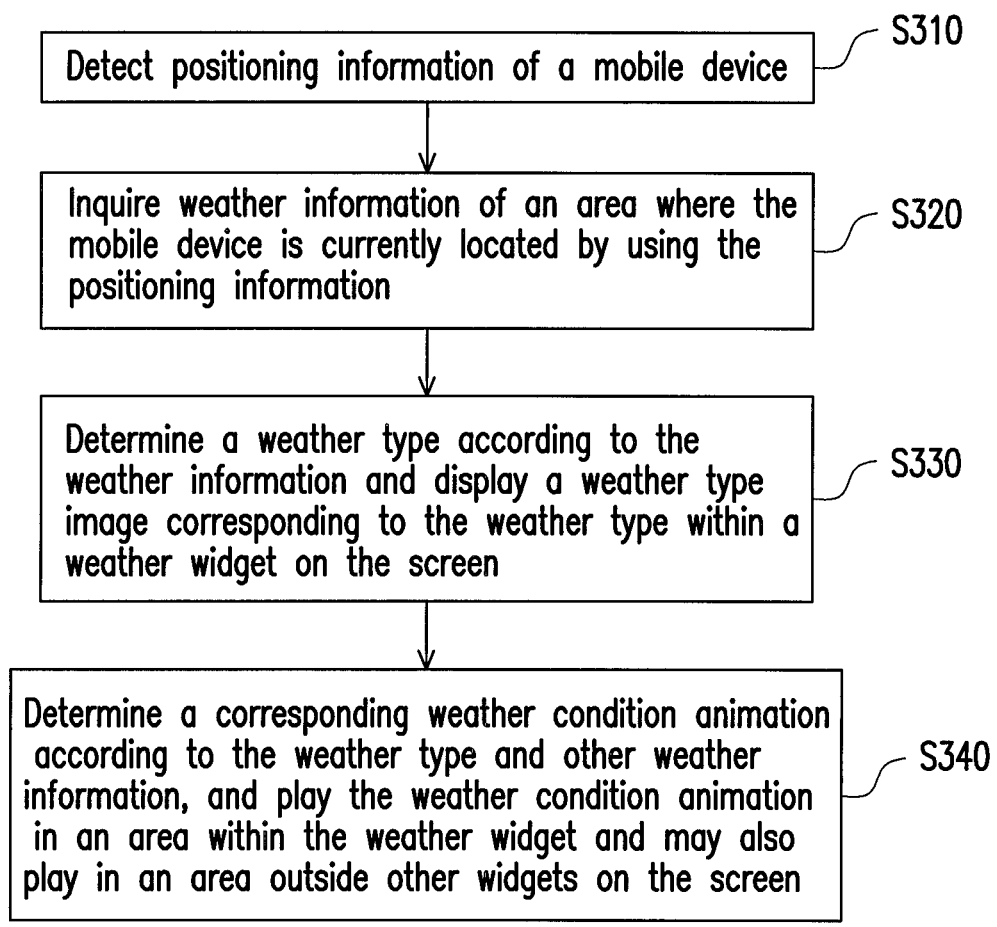
FIG. 3 is a flowchart of a weather condition display method according to a second example of the present application.

FIG. 3 is a flowchart of a weather condition display method according to the second example of the present application. The weather condition display method in the present example is adaptable to a mobile device. Various steps of the weather condition display method will be described below with reference to FIG. 3.

First, positioning information of the mobile device is detected (step S310), and weather information of the area where the mobile device is currently located is inquired by using the positioning information (step S320). To be specific, the mobile device may detect the positioning information through GPS and inquires the weather information through a network. The actual implementation of these two steps in the present example is the same as or similar to that in the first example and therefore it will not be described herein.

It should be noted that in the present example, after the weather information is obtained by the mobile device, a weather type is determined according to the weather information, and a weather type image corresponding to the weather type is displayed on a screen of the mobile device. The mobile device may display the weather type image within a weather widget on the screen (step S330), wherein the weather widget only need a small portion of the entire screen, and there may be more than one widgets on the screen of the mobile device for providing different real-time information to the user. For example, a calendar widget may display a recent schedule, and an email widget may display recently received emails.

However, different from the above-mentioned example, in the mobile device of the present example, the weather condition animation to be played on the background of the screen is determined by further referring to other weather information besides the weather type. The mobile device may play the weather condition animation within the weather widget and may also play in the area outside other widgets on the screen (step S340) so that a more authentic visual sensation may be brought to the user without affecting the user viewing information within other widgets.

It should be noted that even though the user can understand the current weather condition through the display of the weather type image, the real feel of the user in the environment cannot be truly presented. For example, even in a same clear day, climate conditions (for example, temperature, humidity, and pressure) may vary along with the elevation, latitude, terrain, and time of the area, and accordingly, the user may have different sensation in such environments. Even in the sun, the user may still feel cold due to the low temperature or feel hot due to the high humidity.

Thereby, it is necessary for the mobile device to take all weather information of the current area into consideration so as to give the most accurate weather condition information. For example, if the temperature is to be considered, after the weather type is determined, the temperature data in the weather information is further accessed y the mobile device and whether the temperature exceeds a predetermined temperature is determined. If the temperature exceeds the predetermined temperature, a first weather condition animation corresponding to the weather type is played (for example, a wiggly air animation is played to present a hot weather), and if the temperature does not exceed the predetermined temperature, a second weather condition animation corresponding to the weather type is played (for example, a falling leaves animation is played to present a cool weather).

Figure 4B:
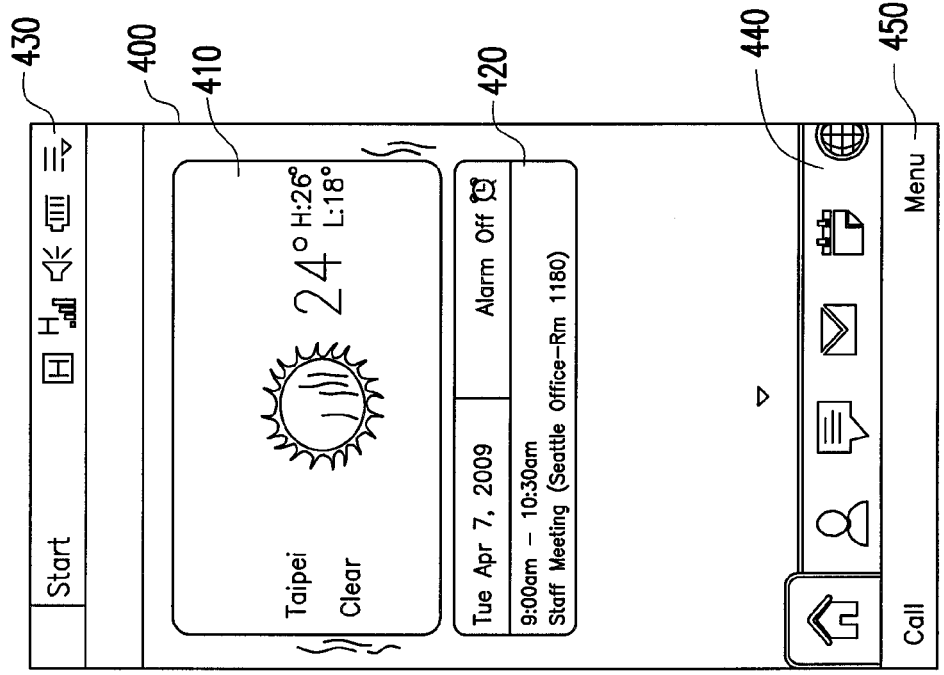
FIG. 4A and FIG. 4B illustrate an example of a weather condition display method according to the second example of the present application.
Figure 4A:
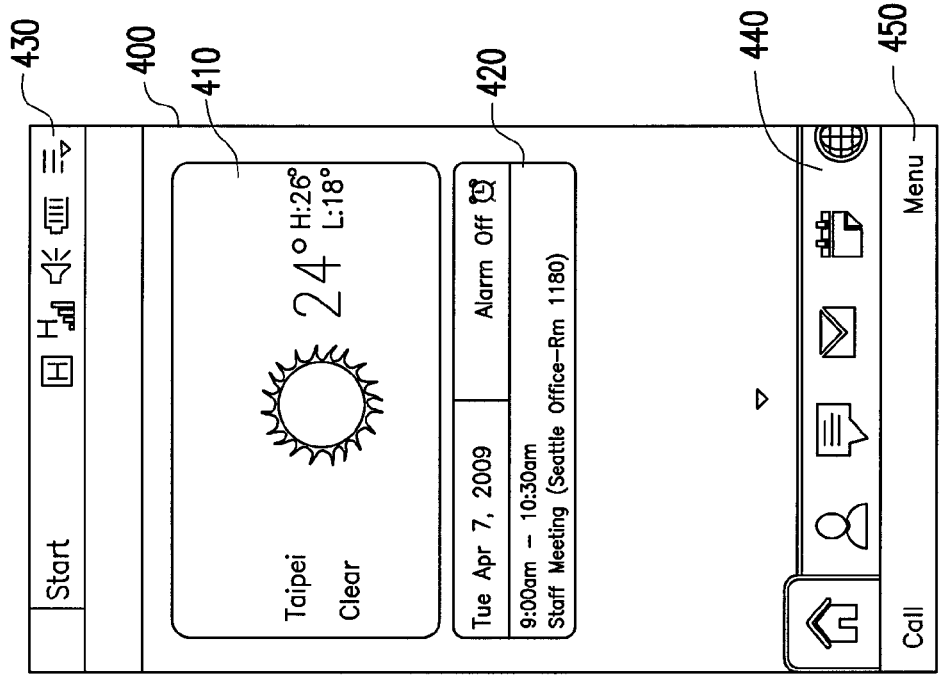

FIGS. 4A and 4B illustrate an example of a weather condition display method according to the second example of the present application. Referring to FIGS. 4A and 4B, in the present example, the screen 400 comprises a weather widget 410, a calendar widget 420, a regular status bar 430, a function image bar 440, and a menu bar 450. In the present example, the weather type determined by the mobile device is sunny. Thus, a sun image 412 is displayed by the mobile device within the weather widget 410 to present the weather type of "sunny" (as shown in FIG. 4A). Meanwhile, because the weather condition further determined by the mobile device is "hot" according to the temperature, a wiggly air animation 414 is further played by the mobile device within the weather widget 410 and the area outside the calendar widget 420, the status bar 430, the function image bar 440, and the menu bar 450 to present the weather condition of "hot." Through the image and the animation, the user can get to know that the local weather is sunny and very hot so that the user may dress less clothing or carry enough water when he goes outsides according to an actual requirement in such an environment.

As described above, in the present example, an appropriate weather condition animation is determining by referring to the weather type and other weather information so that the weather condition of the current area may be precisely presented or forecasted. The weather type image may be displayed when or after the weather condition animation is played by the mobile device. However, the present application is not limited thereto.

Besides the method described above of simply displaying the weather condition, in the present application, the weather condition information is further combined with local time information to determine the most appropriate weather condition animation. This will be described in detail below with reference to another example.

THIRD EXAMPLE

Figure 5:
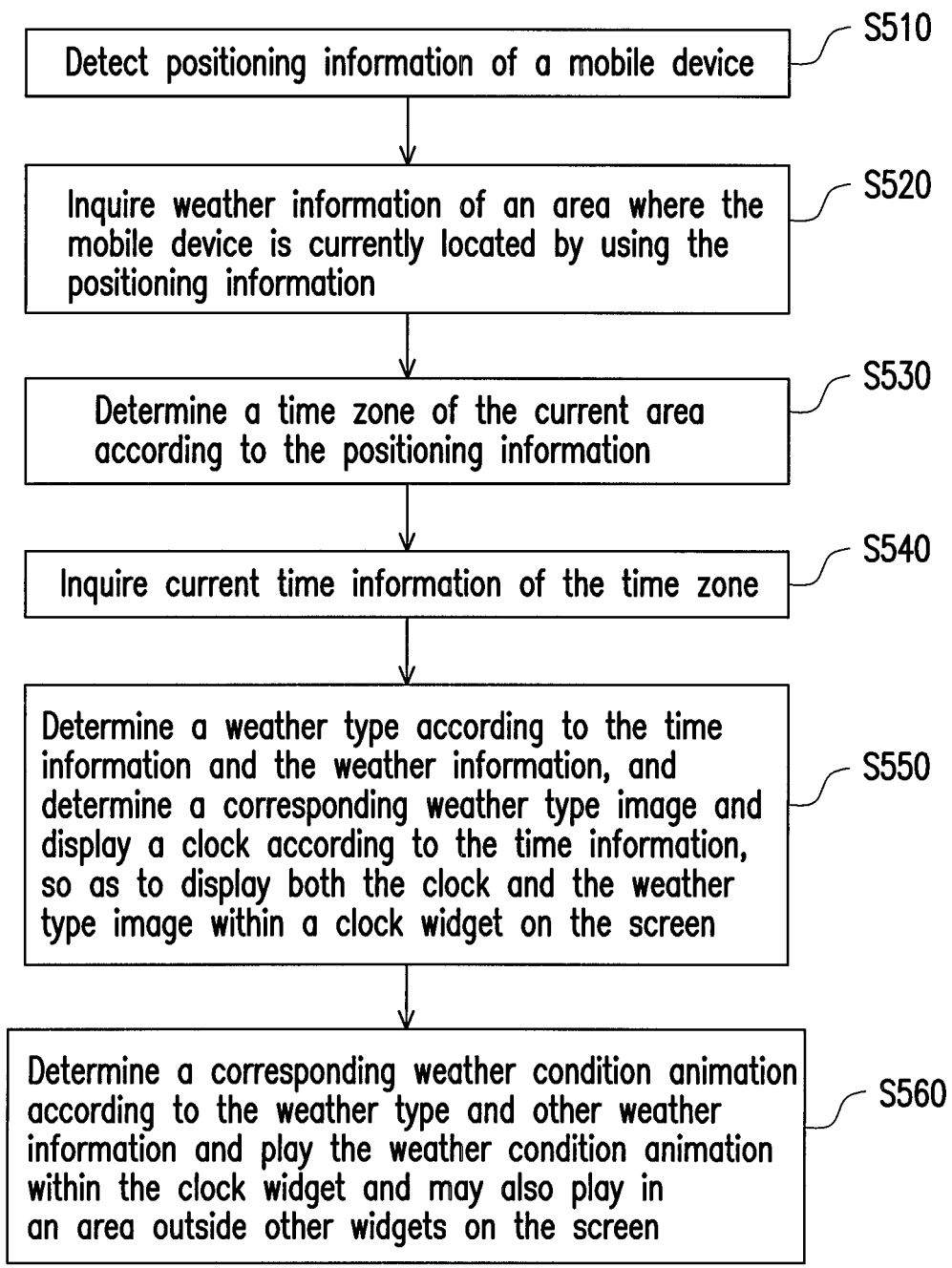
FIG. 5 is a flowchart of a weather condition display method according to a third example of the present application.

FIG. 5 is a flowchart of a weather condition display method according to the third example of the present application. The weather condition display method in the present example is adapted to a mobile device. Various steps of the weather condition display method will be described below with reference to FIG. 5.

First, positioning information of the mobile device is detected (step S510), and weather information of the area where the mobile device is currently located is inquired by using the positioning information (step S520). To be specific, the mobile device may inquire the weather information through a network, wherein the method for inquiring the weather information may be the same as or similar to that in the first example and therefore it will not be described herein.

It should be noted that in the present example, after the positioning information is obtained by the mobile device, time information of the current area is further determined according to the positioning information (step S530). For example, a time zone of the current area is first determined, and the current time information of the time zone is then inquired (step S540). To be specific, the time information may be obtained through the network, and the content thereof contains both time and date information. Alternatively, the time information may also be directly obtained through the time set in the mobile device.

Next, a weather type is determined by the mobile device according to the time information and the previously obtained weather information, and a corresponding weather type image is determined according to the weather type. For example, different weather condition animations are played at day and night in a same sunny day. In the present example, a clock is then displayed according to the time information, and the clock is displayed together with the weather type image within a clock widget on the screen (step S550). The clock widget is usually placed in a homepage or a standby page of the mobile device so that the user may check the current time and weather conveniently. In another example, the clock is not displayed but the weather condition animation is played within the weather widget.

A corresponding weather condition animation is further defined by the mobile device according to other weather information at the same time when the weather type image is displayed. The weather condition animation is played by the mobile device within the clock widget and also in the area outside other widgets on the screen (step S560) so that a more authentic visual sensation is brought to the user without affecting the user viewing information within other widgets.

Figure 6B:
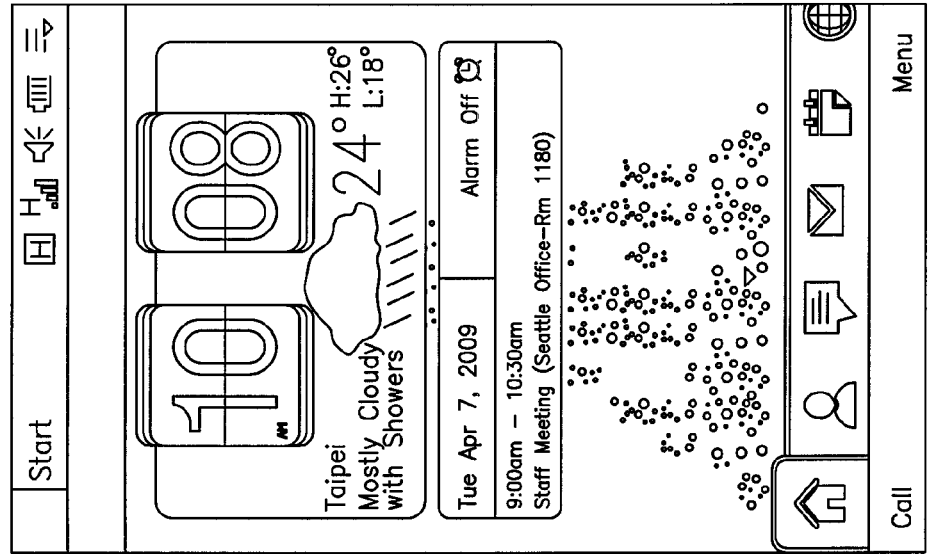
FIGS. 6A~6F illustrate examples of weather condition animations according to the third example of the present application.
Figure 6A:
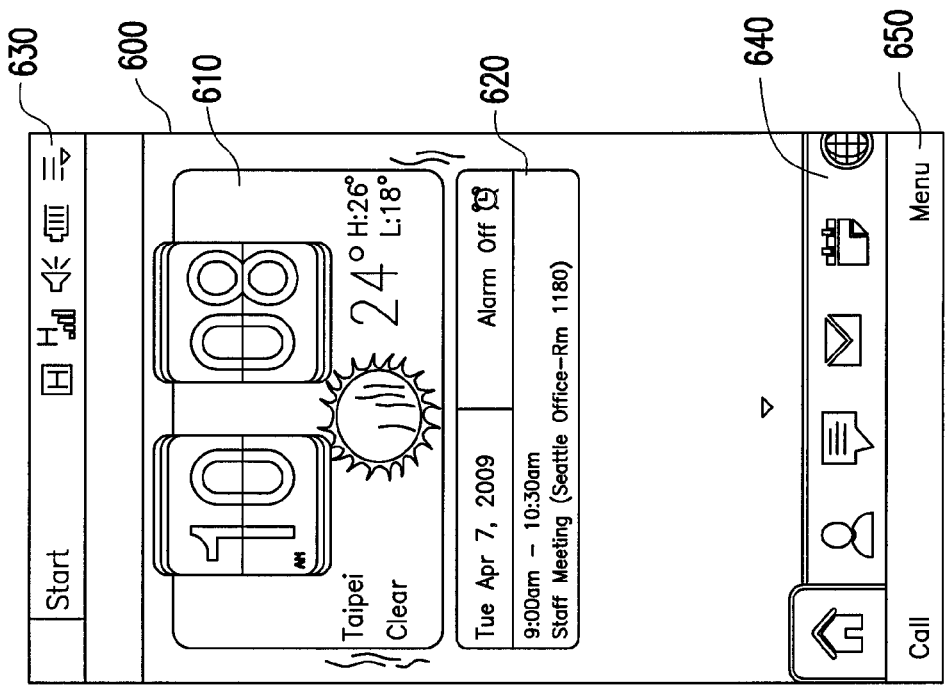
Figure 6C:
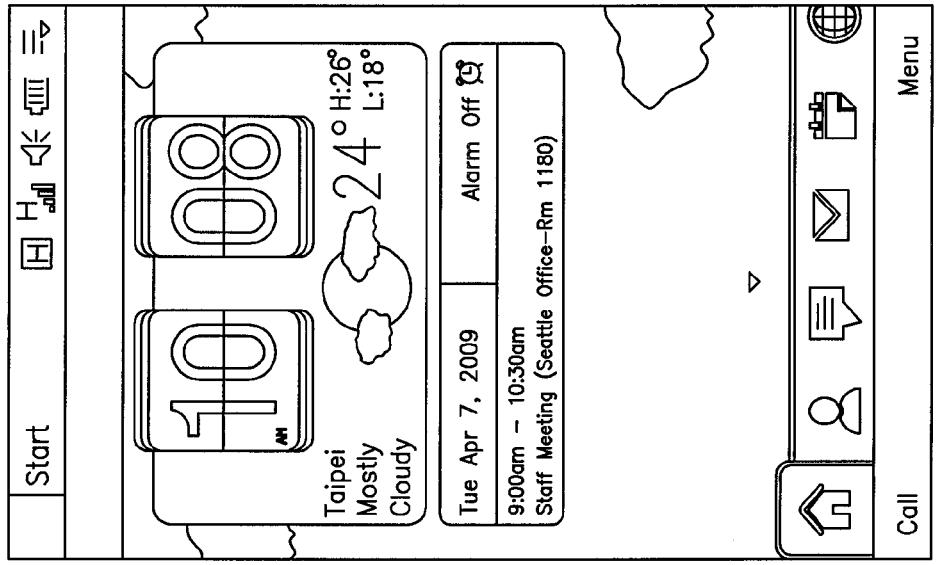
Figure 6D:
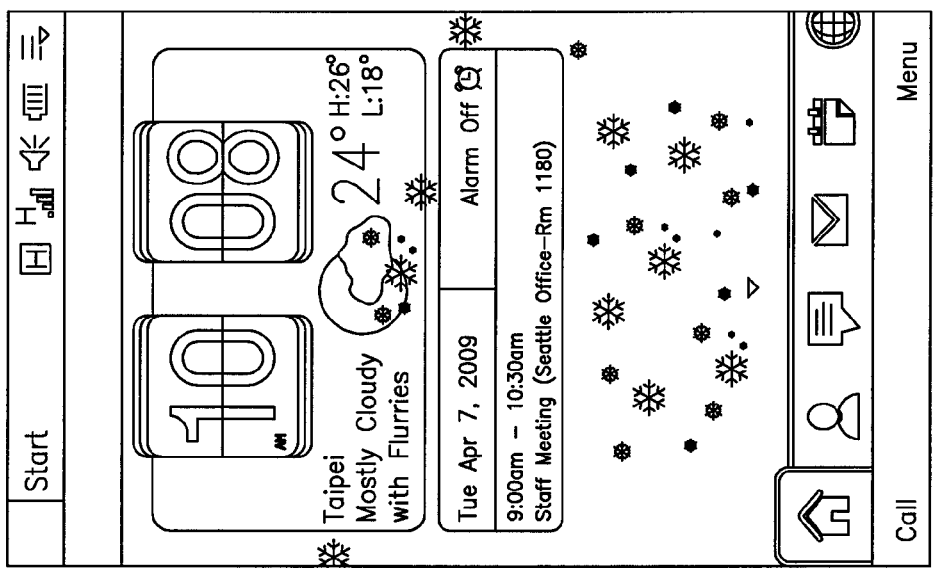
Figure 6F:
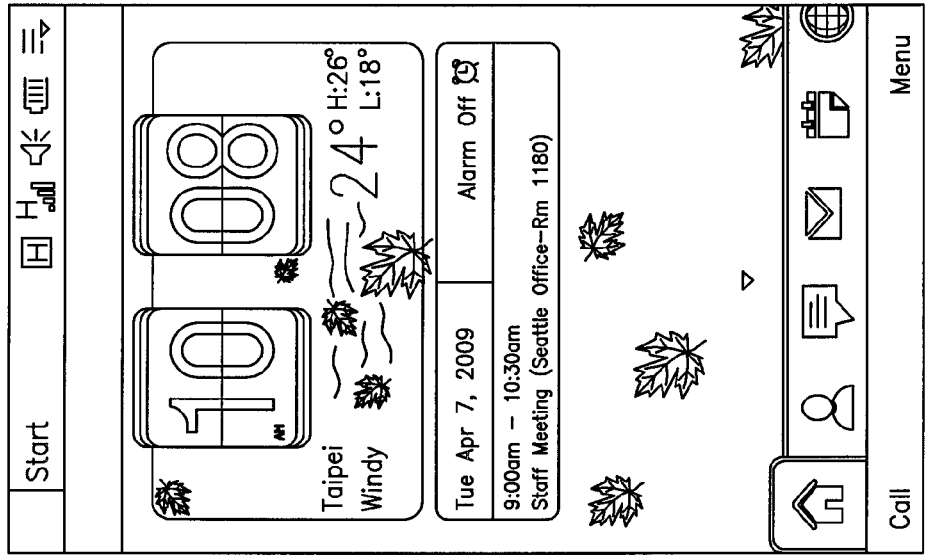
Figure 6E:
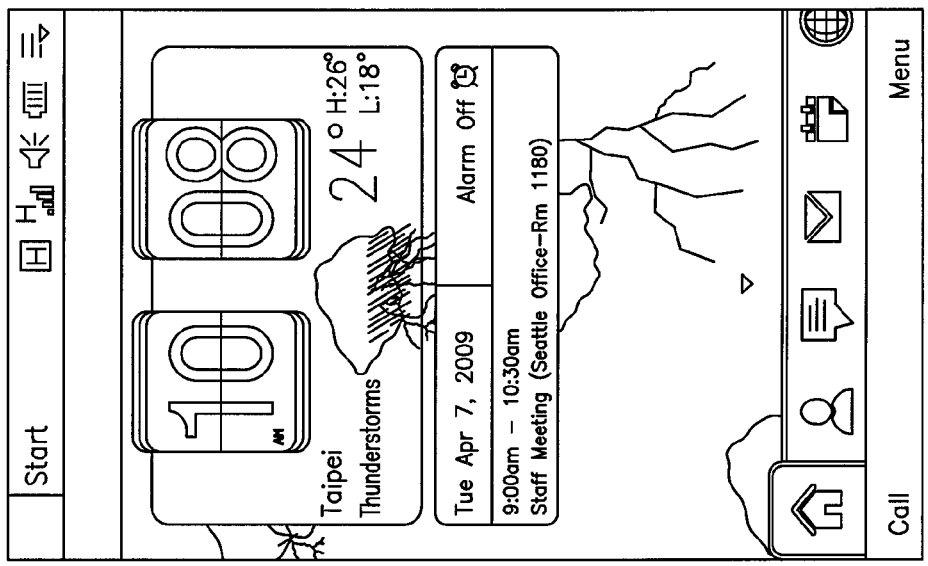

FIGS. 6A~6F illustrate examples of weather condition animations according to the third example of the present application. Referring to FIG. 6A first, the screen 600 in the present example comprises a clock widget 610, a calendar widget 620, and a regular status bar 630, a function icon bar 640, and a menu bar 650. The weather type determined by the mobile device is sunny and the current time is 10:08 AM. Accordingly, a clock showing "10:08" and a sun image 612 showing the sunny weather type are displayed by the mobile device within the clock widget 610. Besides, the weather condition further determined by the mobile device is hot according to the temperature. Accordingly, a wiggly air animation 614 is displayed by the mobile device within the clock widget 610 and in the area outside the calendar widget 620, the status bar 630, the function icon bar 640, and the menu bar 650 to present the hot weather condition. Similarly, FIGS. 6B~6F respectively illustrate a raining animation when the weather type is partly cloudy with showers, a snowing animation when the weather type is mostly cloudy with flurries, a cloudy animation when the weather type is partly sunny, a thundering animation when the weather type is thunderstorms, and a windy animation when the weather type is windy. A user may get to know the actual weather condition besides the current weather type of the local area through foregoing weather condition animations and dress properly according to the actual environment.

It should be noted that the display of the weather type image and the play of the weather condition animation may only be carried out when the user switches the mobile device to a screen page having a weather display function. Herein the screen having the weather display function may be a homepage, a weather widget page, a clock widget page, or a weather function page. However, the definition of the screen page with the weather display function is not limited thereto. In addition, after displaying the weather type image and playing the weather condition animation, the mobile device continuously updates the weather information and changes the displayed weather type image to ensure the accuracy of the weather type image.

For example, the mobile device may re-inquire the weather information of the area where the mobile device is currently located at constant intervals, so as to update the displayed weather type image. The mobile device may also re-inquire the weather information of the area where the mobile device is currently located when the mobile device receives a re-inquiring command issued by the user (for example, by touching the screen) so as to update the displayed weather type image. The mobile device may further continuously detect the positioning information of its current location to determine whether the positioning information changes, and when the positioning information changes, the mobile device re-inquires the weather information of the current area and updates the displayed weather type image. Through the methods described above, the mobile device may instantly update the displayed weather type image according to changes of the weather condition so that the user can get to know the weather changes accurately.

The present application also provides a hardware device corresponding to the weather condition display method described above such that the method may be applied to a mobile phone, a PDA, a PDA phone, a smart phone, a notebook computer, a multimedia player, a game console, a navigation device, or a car computer, etc. The hardware device will be described in detail below with reference to another example.

FOURTH EXAMPLE

Figure 7:
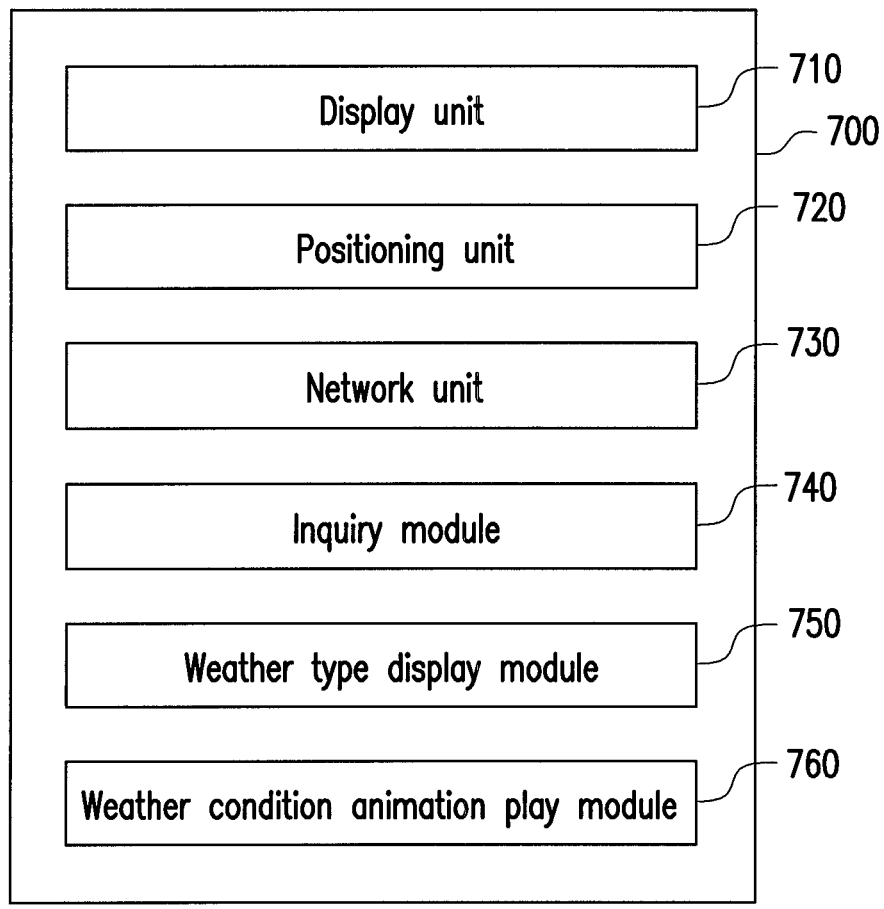
FIG. 7 is a block diagram of a weather condition display apparatus according to a fourth example of the present application.

FIG. 7 is a block diagram of a weather condition display apparatus according to the fourth example of the present application. Referring to FIG. 7, the weather condition display apparatus 700 in the present example comprises a display unit 710, a positioning unit 720, a network unit 730, an inquiry module 740, a weather type display module 750, and a weather condition animation play module 760. The functions of these elements will be respectively described below.

The display unit 710 may be a liquid crystal display (LCD) for displaying a screen page of the weather condition display apparatus 700.

The positioning unit 720 may be a GPS, an AGPS, or other communication positioning system, and which detects positioning information of the weather condition display apparatus 700. Herein the communication positioning system may be GSM, PHS, CDMA, Wi-Fi, or WiMAX. However, the present application is not limited thereto.

The network unit 730 connects to a network through a wired or wireless method. The inquiry module 740 connects to weather information website on the network through the network unit 730 and transfers the positioning information obtained by the positioning unit 720 to the weather information website to obtain weather information of the area where the weather condition display apparatus 700 is currently located.

The weather type display module 750 determines a weather type of the current area according to the weather information obtained by the inquiry module 740 and displays a weather type image corresponding to the weather type on the screen.

The weather condition animation play module 760 determine a corresponding weather condition animation according to the weather type determined by the weather type display module 750 and the weather information obtained by the inquiry module 740 and plays the weather condition animation on the background of the screen. The weather type display module 750 may display the weather type image when or after the weather condition animation play module 760 plays the weather condition animation. In addition, the weather type display module 750 may display the weather type image within a weather widget or a clock widget. However, how the weather type image is displayed is not limited in the present example.

To be specific, in an example, the weather type display module 750 displays the weather type image within a weather widget on the screen. When the weather condition animation play module 760 plays the weather condition animation, the weather condition animation play module 760 also plays the weather condition animation within the weather widget and within the area outside other widgets on the screen.

In another example, the weather condition display apparatus 700 further comprises a time inquiry module (not shown). The time inquiry module determines a time zone of the area where the mobile device is currently located and inquires the current time information of the time zone. When the weather type display module 750 displays the weather type image, the weather type display module 750 further displays a clock according to the time information obtained by the time inquiry module and displays both the clock and the weather type image within a clock widget. On the other hand, when playing the weather condition animation, the weather condition animation play module 760 also plays the weather condition animation within the clock widget and within the area outside other widgets on the screen.

It should be noted that the weather information referred by the weather condition animation play module 760 may be weather type, temperature, humidity, pressure, wind direction, wind force, visibility, UV intensity, and probability of precipitation. Taking the temperature as an example, the weather condition animation play module 760 determines whether the temperature exceeds a predetermined temperature. If the temperature exceeds the predetermined temperature, the weather condition animation play module 760 plays a first weather condition animation corresponding to the weather type, and if the temperature does not exceed the predetermined temperature, the weather condition animation play module 760 plays a second weather condition animation corresponding to the weather type.

As described above, the weather type display module 750 displays the weather type image and the weather condition animation play module 760 plays the weather condition animation every time when the weather condition display apparatus 700 is switched to a screen page having a weather display function. Herein the screen page having the weather display function may be a homepage, a weather widget page, a clock widget page, or a weather function page. After that, the weather condition display apparatus 700 continuously observe the weather changes at the area where the weather condition display apparatus 700 is currently located and updates the displayed weather type image accordingly.

In an example, the weather condition display apparatus 700 re-inquires the weather information of the current area when the inquiry module 740 receives a re-inquiring command issued by the user, so as to update the weather type image displayed by the weather type display module 750. In another example, the weather condition display apparatus 700 re-inquires the weather information of the current area at constant intervals through the inquiry module 740, so as to update the weather type image displayed by the weather type display module 750. In yet another example, the inquiry module 740 of the weather condition display apparatus 700 determines whether the positioning information detected by the positioning unit 720 changes, and when the positioning information changes, the inquiry module 740 re-inquires the weather information of the current area so as to update the weather type image displayed by the weather type display module 750.

The present application further provides a recording medium which records a computer program to be loaded into a mobile device to execute the weather condition display method described above. The computer program is composed of a plurality of program instructions (for example, an organization chart establishing program instruction, a table approving program instruction, a setting program instruction, and a deployment program instruction, etc), and these program instructions are loaded into the communication device and executed by the same to accomplish various steps in the weather condition display method and various functions of the weather condition display apparatus described above.

As described above, the present application provides a weather condition display method, a weather condition display apparatus, and a recording medium, wherein weather information of an area where a mobile device is located is inquired by using positioning information of the mobile device, and a weather type image corresponding to the weather type is displayed to present the weather condition of the area to a user. In addition, in the present application, a weather condition of the current area is determined according to the weather type and other weather information, for example temperature and humidity, and a weather condition animation is played according to the weather condition so as to present the actual sensation in the environment to the user. Thereby, the user can get to know the weather changes in the local area and make preparation to go out accordingly.

It will be apparent to those skilled in the art that various modifications and variations can be made to the structure of the present application without departing from the scope or spirit of the application. In view of the foregoing, it is intended that the present application cover modifications and variations of this application provided they fall within the scope of the following claims and their equivalents.

What is claimed is:

1. A weather condition display method, adaptable to a mobile device, the weather condition display method comprising:
   detecting positioning information of the mobile device;
   inquiring weather information according to the positioning information of the mobile device;
   determining a weather type according to the weather information and time by selecting a weather type according to a mapping table which comprises a discrete number of predetermined weather types with each discrete predetermined weather type mapped to a corresponding weather condition animation, wherein a plurality of the weather types are mapped to a same weather condition animation;
   displaying a weather type image corresponding to the weather type on a screen of the mobile device; and
   determining the corresponding weather condition animation according to the weather type and playing the weather condition animation on a background of the screen in addition to displaying the weather type image, wherein different weather condition animations are displayed for different time of the same weather type image.

2. The method according to claim 1, wherein the step of displaying the weather type image on the screen of the mobile device comprises:
   displaying the weather type image within a weather widget on the screen.

3. The method according to claim 1, wherein the step of determining the weather type according to the weather information and displaying the weather type image corresponding to the weather type on the screen of the mobile device further comprises:
   inquiring time information according to the positioning information of the mobile device; and
   determining the weather type according to the weather information and the time information, and displaying the weather type image corresponding to the weather type on the screen of the mobile device.

4. The method according to claim 3, wherein the step of inquiring the time information according to the positioning information of the mobile device comprises:
   determining a time zone according to the positioning information of the mobile device; and
   inquiring the current time information of the time zone.

5. The method according to claim 3, wherein the step of displaying the weather type image on the screen of the mobile device comprises:
   displaying a clock according to the time information; and
   displaying both the weather type image and the clock within a clock widget on the screen.

6. The method according to claim 1, wherein the weather information comprises one or a combination of weather type, temperature, humidity, pressure, wind direction, wind force, visibility, ultraviolet (UV) intensity, and probability of precipitation.

7. The method according to claim 6, wherein the step of determining the corresponding weather condition animation according to the weather type and playing the weather condition animation on the background of the screen comprises:
   determining the corresponding weather condition animation according to the weather type and other weather information.

8. The method according to claim 1, wherein the step of determining the corresponding weather condition animation according to the weather type and playing the weather condition animation on the background of the screen further comprises:
   inquiring time information according to the positioning information of the mobile device; and
   determining the corresponding weather condition animation according to the weather type and the time information.

9. The method according to claim 1, wherein after the step of displaying the weather type image and playing the weather condition animation, the method further comprises:

continuously detecting the positioning information of the mobile device to determine whether the positioning information changes; and re-inquiring the weather information according to the positioning information of the mobile device to update the displayed weather type image if the positioning information changes.

10. The method according to claim 1, wherein after the steps of displaying the weather type image and playing the weather condition animation, the method further comprises:

re-playing the weather condition animation and displaying the weather type image every time when the mobile device is switched to a screen page having a weather display function.

11. The method of claim 1, wherein the step of determining a weather type according to the weather information and time by selecting a weather type according to a mapping table which comprises a discrete number of predetermined weather types with each discrete predetermined weather type mapped to a corresponding weather condition animation further comprises:

selecting a sub-variation of the weather type which is mapped to a plurality of different weather condition animations; and selecting the weather condition animation according to a first threshold.

12. The method of claim 1, wherein the weather type image and the weather condition animation are displayed simultaneously.

13. A non-transitory recording medium, recording program instructions for detecting positioning information of the mobile device;
inquiring weather information according to the positioning information of the mobile device;
determining a weather type according to the weather information and time by selecting a weather type according to a mapping table which comprises a discrete number of predetermined weather types with each discrete predetermined weather type mapped to a corresponding weather condition animation, wherein a plurality of the weather types are mapped to a same weather condition animation;
displaying a weather type image corresponding to the weather type on a screen of the mobile device; and
determining a corresponding weather condition animation according to the weather type and playing the weather condition animation on a background of the screen in addition to displaying the weather type image, wherein different whether condition animations are displayed for different time of the same weather type image.

14. A handheld electronic apparatus, comprising:
a display unit, for displaying a screen page;
a positioning unit, for detecting positioning information of the weather condition display apparatus;
a network unit, for connecting to a network;

an inquiry module, for inquiring weather information according to the positioning information;

a weather type display module, for determining a weather type according to the weather information and time by selecting a weather type according to a mapping table which comprises a discrete number of predetermined weather types with each discrete predetermined weather type mapped to a corresponding weather condition animation obtained by the inquiry module, and displaying a weather type image corresponding to the weather type on the screen, wherein a plurality of the weather types are mapped to a same weather condition animation; and a weather condition animation play module, for determining a corresponding weather condition animation according to the weather type determined by the weather type display module and playing the weather condition animation on a background of the screen page in addition to displaying the weather type image, wherein different whether condition animations are displayed for different time of the same weather type image.

15. The apparatus according to claim 14, wherein the weather type display module displays the weather type image within a weather widget on the screen page.

16. The apparatus according to claim 14 further comprising:

a time inquiry module, for determining a time zone according to the position information and inquiring a current time information of the time zone.

17. The apparatus according to claim 16, wherein the weather type display module further determines the weather type according to the weather information and the time information and displays the weather type image corresponding to the weather type on the screen page of the apparatus.

18. The apparatus according to claim 16, wherein the weather type display module further displays a clock according to the time information and displays both the clock and the weather type image within a clock widget.

19. The apparatus according to claim 16, wherein the weather condition animation play module further determines the corresponding weather condition animation according to the weather type and the time information.

20. The apparatus according to claim 19, wherein the weather condition animation play module further determines the corresponding weather condition animation according to the weather type determined by the weather type display module and other weather information obtained by the inquiry module.

21. The apparatus according to claim 14, wherein the inquiry module further determines whether the positioning information detected by the positioning unit changes, and when the positioning information changes, re-inquires the weather information of the current area so as to update the weather type image displayed by the weather type display module.

* * * * *